United States Patent
Raney

(10) Patent No.: US 10,142,263 B2
(45) Date of Patent: Nov. 27, 2018

(54) PACKET DEDUPLICATION FOR NETWORK PACKET MONITORING IN VIRTUAL PROCESSING ENVIRONMENTS

(71) Applicant: Keysight Technologies Singapore (Holdings) Pte. Ltd., Singapore (SG)

(72) Inventor: Kristopher Raney, Austin, TX (US)

(73) Assignee: Keysight Technologies Singapore (Holdings) PTE LTD, Singapore (SG)

( * ) Notice: Subject to any disclaimer, the term of this patent is extended or adjusted under 35 U.S.C. 154(b) by 0 days.

(21) Appl. No.: 15/455,215

(22) Filed: Mar. 10, 2017

(65) Prior Publication Data
US 2018/0241699 A1 Aug. 23, 2018

Related U.S. Application Data

(60) Provisional application No. 62/461,593, filed on Feb. 21, 2017.

(51) Int. Cl.
*H04L 12/939* (2013.01)
*H04L 12/26* (2006.01)
*H04L 12/24* (2006.01)

(52) U.S. Cl.
CPC ........ *H04L 49/552* (2013.01); *H04L 41/0668* (2013.01); *H04L 43/04* (2013.01); *H04L 43/0876* (2013.01); *H04L 43/10* (2013.01); *H04L 43/12* (2013.01)

(58) Field of Classification Search
None
See application file for complete search history.

(56) References Cited

U.S. PATENT DOCUMENTS

| | | |
|---|---|---|
| 7,363,329 B1 | 4/2008 | Bhagwan et al. |
| 7,400,626 B2 | 7/2008 | Hong |
| 7,406,082 B2 | 7/2008 | Nagarajan et al. |
| 7,619,993 B2 | 11/2009 | Bender et al. |
| 7,729,240 B1 | 6/2010 | Crane et al. |
| 8,179,792 B1 | 5/2012 | Doerr et al. |
| 8,462,781 B2 | 6/2013 | McGhee et al. |
| 9,110,703 B2 | 8/2015 | Santos et al. |
| 9,680,728 B2 | 6/2017 | Besser |
| 2004/0109365 A1 | 6/2004 | Stojancic |

(Continued)

OTHER PUBLICATIONS

Ixia, Ixia xFilter, Data Sheet, 5 pgs. (May 2015).
(Continued)

*Primary Examiner* — Anh Ngoc M Nguyen

(57) ABSTRACT

Systems and methods are disclosed for packet deduplication for network packet monitoring in virtual processing environments. Tap agents are installed and run with respect to network applications operating with virtual processing environments. These tap agents capture packet traffic associated within these network applications, and deduplication rules are applied so that duplicate packet capture is avoided at the tap agents themselves. In particular, deduplication rules are applied to tap agents where two network applications for which packets are being captured are talking to each other so that one of the tap agents is set to the designated agent for packet capture. Without this designation, packets captured at by the two associated packet agents would represent the same packet flow from both ends thereby leading to duplicate packet capture.

34 Claims, 12 Drawing Sheets

(56) References Cited

U.S. PATENT DOCUMENTS

| | | |
|---|---|---|
| 2005/0018668 A1 | 1/2005 | Cheriton |
| 2008/0065639 A1 | 3/2008 | Choudhary et al. |
| 2009/0158046 A1 | 6/2009 | Milliken et al. |
| 2009/0225676 A1 | 9/2009 | Kisela et al. |
| 2010/0195519 A1 | 8/2010 | Ji |
| 2011/0004698 A1 | 1/2011 | Wu |
| 2011/0206055 A1* | 8/2011 | Leong .................. H04L 49/00 370/401 |
| 2011/0273982 A1 | 11/2011 | Akirav et al. |
| 2011/0289281 A1 | 11/2011 | Spackman |
| 2012/0257626 A1* | 10/2012 | McGhee ............. H04L 45/7453 370/392 |
| 2012/0257631 A1* | 10/2012 | Nguyen ................. H04L 43/16 370/400 |
| 2013/0031233 A1 | 1/2013 | Feng et al. |
| 2013/0291109 A1 | 10/2013 | Staniford et al. |
| 2014/0229605 A1 | 8/2014 | Besser |
| 2015/0263889 A1 | 9/2015 | Newton |
| 2015/0319030 A1 | 11/2015 | Nachum |
| 2016/0094418 A1 | 3/2016 | Raney |
| 2016/0110211 A1 | 4/2016 | Karnes |
| 2016/0149820 A1* | 5/2016 | McGhee ................. H04L 47/32 370/230 |
| 2017/0099195 A1 | 4/2017 | Raney |
| 2017/0099197 A1 | 4/2017 | Raney |
| 2017/0118102 A1 | 4/2017 | Majumder et al. |
| 2017/0163510 A1 | 6/2017 | Arora et al. |

OTHER PUBLICATIONS

Ixia, Ixia Phantom vTap With TapFlow Filtering, Data Sheet, 4 pgs. (Jul. 2015).

Ixia, Ixia Hex Tap, Data Sheet, 5 pgs. (Oct. 2015).

Hofstede et al., "How Monitoring Explained: From Packet Capture to Data Analysis With NetFlow and IPFIX", IEEE, 31 pgs. (May 2014).

\* cited by examiner

PACKET DEDUPLICATION FOR NETWORK PACKET MONITORING IN VIRTUAL PROCESSING ENVIRONMENTS

RELATED APPLICATIONS

This application claim priority to U.S. Provisional Patent Application Ser. No. 62/461,593, which was filed Feb. 21, 2017, and is entitled "PACKET DEDUPLICATION FOR NETWORK PACKET MONITORING IN VIRTUAL PROCESSING ENVIRONMENTS," which is hereby incorporated by reference in its entirety.

TECHNICAL FIELD

This invention relates to monitoring network packets within network communication systems and, more particularly, to monitoring network packets within virtual processing environments.

BACKGROUND

Packet-based data networks continue to grow in importance, and it is often desirable to monitor network traffic associated with these packet-based networks on an ongoing basis. To meet these monitoring needs, copies of network packets can be forwarded to diagnostic network monitoring tools. Packets are often forwarded using network hubs, test access ports (TAPs), and/or switched port analyzer (SPAN) ports available on network switch systems.

To help alleviate the problem of limited access to network packets for monitoring, tool aggregation devices or packet broker devices have also been developed that allow shared access to the monitored network packets. In part, these network packet broker devices allow users to obtain packets from one or more network monitoring points (e.g., network hubs, TAPs, SPAN ports, etc.) and to forward them to different monitoring tools. Network packet brokers can be implemented as one or more packet processing systems in hardware and/or software that provide access and visibility to multiple monitoring tools. These network packet brokers can also aggregate monitored traffic from multiple source links and can load balance traffic of interest to various tools. The traffic of interest can be network packets that are selected by the packet brokers through packet filters and related packet forwarding rules that identify particular packets or packet flows from within the monitored network traffic as traffic of interest.

Network packet analysis tools include a wide variety of devices that analyze packet traffic, including traffic monitoring devices, packet sniffers, data recorders, voice-over-IP monitors, intrusion detection systems, network security systems, application monitors, and/or other network tool devices or systems. Network analysis tools, such as traffic analyzers, are used within packet-based data networks to determine details about the network packet traffic flows within the packet communication network infrastructure.

Certain network communication systems also include virtual processing environments that include virtual machine (VM) platforms hosted by one or more VM host servers. For example, network applications and resources can be made available to network-connected systems as virtualized resources operating within virtualization layers on VM host servers. In some embodiments, processors or other programmable integrated circuits associated with a server processing platform (e.g., server blade) and/or combinations of such server processing platforms operate to provide VM platforms within the server processing platforms. A virtual machine (VM) platform is an emulation of a processing system or network application that is formed and operated within virtualization layer software being executed on a host hardware system. By operating multiple VM platforms including application instances within such a virtualization layer also operating on the host hardware system, a variety of processing resources can be provided internally to the virtual processing environment and/or externally to other network-connected processing systems and devices.

When a network to be monitored includes virtual processing environments, however, difficulties arise in determining managing and controlling packet traffic for network communications with VM platforms operating within such virtual processing environments. For example, web based computing services (e.g., Amazon Web Services) allow a wide variety of external users to obtain dedicated and elastic processing resources within virtual processing environments running on a large number of interconnected servers. These external users can install, initialize, and operate a wide variety of user application as instances within VM platforms operating within the virtual processing environment. Further, the external users can be corporate or commercial entities that provide multiple different application services to employees and/or end-user consumers of the processing resources. When one or more of these external users desires to monitor, manage, and/or control traffic with respect to their respective VM platforms, difficulties arise in obtaining the network packet traffic to be monitored.

FIG. 1 (Prior Art) is a block diagram of an example embodiment 100 for a prior solution that operates to collect network packets from multiple monitoring points and provides those packets to a network tool or a network packet broker (NPB). The network tool can be one or more virtual or physical tools that processes received packets, and the NPB can also be one or more virtual or physical devices that distribute received packets to one or more network tools. For the embodiment 100, a packet flow (FLOW X) 110 is assumed to be sent from a first VM platform (VM1) 102 to a second VM platform (VM2) 112. A first virtual tap (TAP 1) 104 monitors traffic exiting the egress port 106 for the first VM platform 102 and sends a copy 108 of the packets in the packet flow 110 to the destination tool/NPB 120. The second virtual tap (TAP 2) 114 monitors traffic entering the ingress port 116 for the second VM platform 112 and sends a copy 118 of the packets in the packet flow 110 to the destination tool/NPB 120. As such, the destination tool/NPB 120 receives a first copy 108 and a second copy 118 of the packets within the packet flow 110. These duplicate copies 108/118 of the packets within the packet flow 110 create additional processing requirements for the network tool that is analyzing the captured packets unless a deduplication process is applied to remove duplicate packets. As shown a deduplication processor module 122 can be included as part of the tool/NPB 120 to analyze the captured packets from the virtual taps 104/114 and remove duplicate packets prior to further processing of the captured packets.

This deduplication processing, however, requires processing resources to be allocated and used within the tool/NPB 120. For example, comparison algorithms and/or hash algorithms may be used along with associated data storage to implement the packet comparisons in order to identify and discard duplicate packets. These additional resource requirements including the memory required for data storage can be become significant where a large number of virtual taps are employed within a virtual processing environment to monitor network communications. In addition to the increased processing requirements, the communication of the captured duplicate packet copies 108/118 within the virtual and/or physical network environment also uses network communication bandwidth thereby causing reduction in overall system performance where a large number of virtual taps are employed.

SUMMARY

Systems and methods are disclosed for packet deduplication for network packet monitoring in virtual processing environments. Tap agents are installed and run with respect to network applications operating with virtual processing environments. These tap agents capture packet traffic associated within these network applications, and deduplication rules are applied so that duplicate packet capture is avoided at the tap agents themselves. In particular, deduplication rules are applied to tap agents where two network applications for which packets are being captured are talking to each other so that one of the tap agents is set to the designated agent for packet capture. Without this designation, packets captured at by the two associated packet agents would represent the same packet flow from both ends thereby leading to duplicate packet capture. Various embodiments are disclosed and different features and variations can be implemented and utilized.

For one embodiment, a method to capture network traffic is disclosed including communicating network traffic between applications operating within virtual processing environments within one or more host servers, and monitoring the network traffic between the applications using tap agents operating within the virtual processing environments within the one or more host servers. For network packet flows communicated between any two applications being monitored by two tap agents, the method further includes determining which of the two tap agents is a designated agent to capture the network packets within the packet flows to avoid duplicate packet capture, capturing the network packets using the designated agent, and forwarding the captured network packets to one or more network destinations.

In additional embodiments, the method includes using a registry list including the tap agents to perform the determining independently at each of the two tap agents. In further embodiments, the registry list is forwarded to the tap agents by an agent controller. In still further embodiments, the agent controller is operating within a virtual processing environment within a host server.

In additional embodiments, the method includes using the registry list to form a sorted ring of network nodes and performing the determining based upon the sorted ring of network nodes. In further embodiments, the tap agents combine to form an odd number of network nodes, and the determining selects each tap agent as a designated agent with respect to half of remaining tap agents. In still further embodiments, the tap agents combine to form an even number of network nodes, and the determining selects each tap agent as a designated agent for half of remaining tap agents rounded down or rounded up.

In additional embodiments, the method includes generating deduplication rules based upon the determining where the deduplication rules identify packets to capture and packets not to capture and includes applying the deduplication rules to the tap agents. In further embodiments, the method includes using the deduplication rules to implement packet filters for the tap agents.

In additional embodiments, at least one of the tap agents is associated with each application. In further embodiments, the one or more network destinations include at least one of a network tool or a network packet broker. In still further embodiments, the one or more network destinations include a plurality of network tools operating within virtual processing environments within one or more host servers.

In additional embodiments, the determining, capturing, and forwarding are performed independently for each of the network packet flows. In further embodiments, the determining includes negotiating between the two tap agents to select the designated agent for each network packet flow. In still further embodiments, the determining includes communicating flow information from the two tap agents to an agent controller and allowing the agent controller to select the designated agent for each network flow.

In additional embodiments, the method includes identifying a standby agent in addition to the designated agent, and capturing the packets using the standby agent if a failure occurs with respect to the designated agent. In further embodiments, the method includes communicating heartbeat messages with the designated agent, and determining a failure has occurred if a heartbeat message is not communicated within a predetermined period of time.

For one embodiment, a system to capture network traffic is disclosed including one or more host servers configured to host applications operating within virtual processing environments to communicate network traffic and to host tap agents operating within the virtual processing environments to monitor the network traffic between the applications. For network packet flows communicated between any two applications monitored by two tap agents, the two tap agents are configured to determine which of the two tap agents is a designated agent to capture the network packets to avoid duplicate packet capture, capture the network packets using the designated agent, and forward the captured network packets to one or more network destinations.

In additional embodiments, the tap agents are further configured to use a registry list including the tap agents to determine the designated agent independently at each of the two tap agents. In further embodiments, the tap agents are further configured to receive the registry list from an agent controller. In still further embodiments, the agent controller is configured to operate within a virtual processing environment within a host server.

In additional embodiments, the tap agents are configured to form a sorted ring of nodes using the registry list and to use the sorted ring of nodes to determine the designated agent. In further embodiments, the tap agents combine to form an odd number of nodes, and each tap agent is a designated agent with respect to half of remaining tap agents. In still further embodiments, the tap agents combine to form an even number of nodes, and each tap agent is a designated agent for half of remaining tap agents rounded down or rounded up.

In additional embodiments, the tap agents are further configured to generate deduplication rules identifying packets to capture and packets not to capture. In further embodiments, the tap agents are further configured to use the deduplication rules to implement packet filters.

In additional embodiments, at least one of the tap agents is associated with each application. In further embodiments, the one or more network destinations include at least one of a network tool or a network packet broker. In still further embodiments, the one or more network destinations include a plurality of network tools operating within virtual processing environments within one or more host servers.

In additional embodiments, the two tap agents are configured to determine a designated agent independently for each of network packet flows. In further embodiments, the two tap agents are further configured to negotiate with each other to select the designated agent for each network packet flow. In still further embodiments, the two tap agents are further configured to communicate flow information to an agent controller and to allow the agent controller to select the designated agent for each network flow.

In additional embodiments, the tap agents are further configured to determine a standby agent in addition to the designated agent, and the standby agent is further configured to capture the packets if a failure occurs with respect to the designated agent. In further embodiments, the designated agent is further configured to communicate heartbeat messages, and the standby agent is further configured to determine a failure has occurred if a heartbeat message is not communicated within a predetermined period of time.

Different or additional features, variations, and embodiments can be implemented, if desired, and related systems and methods can be utilized, as well.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION

Systems and methods are disclosed for packet deduplication for network packet monitoring in virtual processing environments. Various embodiments are disclosed and different features and variations can be implemented and utilized.

For the embodiments disclosed, tap agents are installed and run with respect to network applications operating with a virtual processing environment. These tap agents are configured to capture packet traffic associated within these network applications, and deduplication rules are applied so that duplicate packet capture is avoided at the tap agents themselves. In particular, deduplication rules are applied where two network applications for which packets are being captured are talking to each other as packets captured at these two sources will represent the same packet flow from both ends.

One deduplication approach described herein uses a sorted list of the tap agents to determine which tap agent will be responsible for capturing packets being communicated between any particular pair of tap agents within the sorted list. In addition, all source/destination IP (Internet Protocol) addresses can be tracked for a particular tap agent so that network communications between tap agent pairs can be properly identified. If an agent is responsible for packet capture for the tap agent pair, it will capture the packets and forward them to a network destination such as a network tool or network packet broker (NPB). If an agent is not responsible for packet capture for the tap agent pair, it will filter and drop the packets received with respect to that tap agent pair. As such, deduplication rules applied by the tap agents provide for capture of network packets at only one agent associated with packet communications between two agents thereby providing deduplication of captured packets at the tap agents themselves. In addition, with this deduplication technique, comparison data and/or tables are not required to be stored or maintained on a packet-by-packet basis for deduplication purposes.

Figure 1:
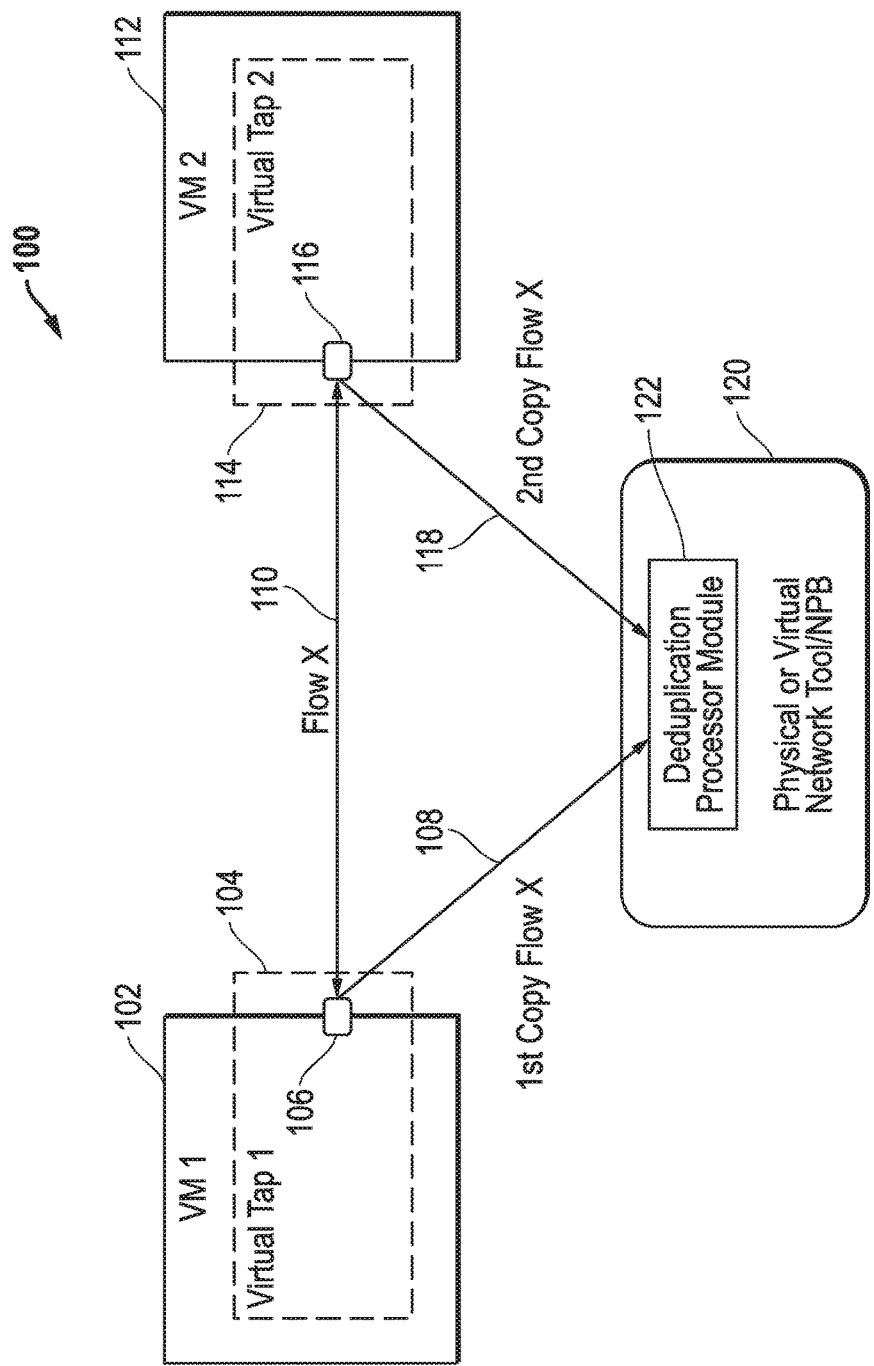
FIG. 1 (Prior Art) is a block diagram of an example embodiment for a prior solution that operates to collect network packets from multiple monitoring points and provides those packets to a network tool or a network packet broker (NPB).
Figure 2:
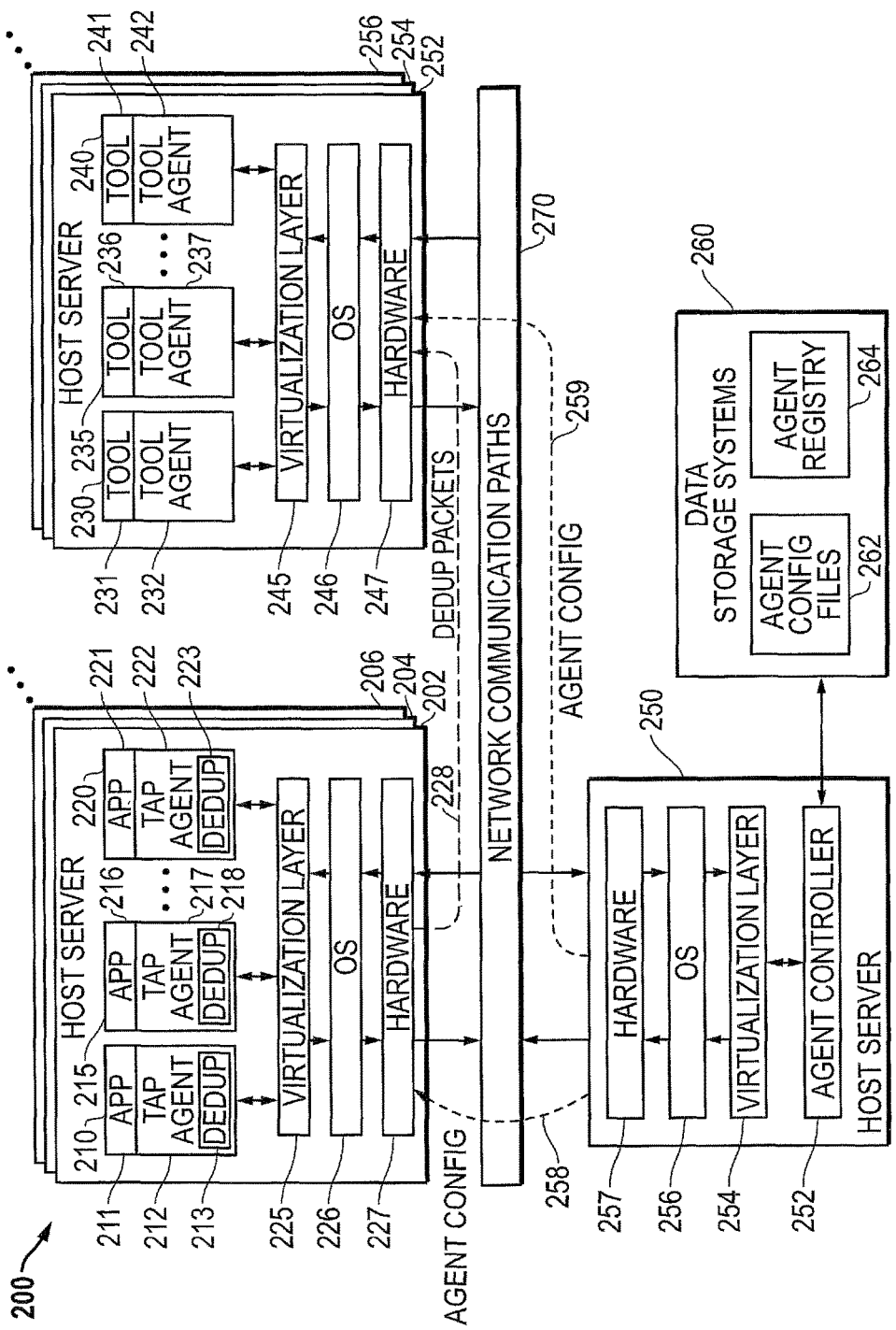
FIG. 2 is a block diagram of an example embodiment for packet deduplication for network packet monitoring within virtual processing environments.

FIG. 2 is a block diagram of an example embodiment 200 for packet deduplication for network packet monitoring within virtual processing environments. For the example embodiment 200, network applications 211, 216 . . . 221 operate as virtual application instances within virtual machine (VM) platforms 210, 215 . . . 220 operating within host server 202. Similar network applications and VM platforms can operate in additional host servers 204 and 206, and so on, to send and receive network packets through the network communication paths 270. Network tap agents 212, 217 . . . 222 operate as virtual tap instances within virtual machine (VM) platforms 210, 215 . . . 220 operating within the host server 202, and the tap agents 212/217/222 monitor and capture packet traffic associated with the network applications 211/216/221. Although a tap agent 212/217/222 is shown as associated with each of the applications 211/216/221 to monitor network traffic for that application, it is also noted that one or more of the tap agents 212/217/222 could also be configured to monitor network traffic for multiple network applications. Similar tap agents can operate with respect to network applications and VM platforms running in the additional host servers 204 and 206, and so on. The network applications 211/216/221 and tap agents 212/217/222 operate within a virtualization layer 225 that operates on top of an operating system (OS) 226 which in turn operates on computer hardware 227. The computer hardware 227 is coupled to communicate with the network communication paths 270, for example, through one or more network interface cards and/or other network connections.

Network tools 231, 236 . . . 241 operate as virtual tool instances within virtual machine (VM) platforms 230, 235 . . . 240 operating within host server 252. Similar network tools and VM platforms can operate in additional host servers 254 and 256, and so on, to receive and monitor network packets associated with the packet communications for the network applications 211/216/221 and/or other packet traffic within the network communication paths 270. Network tool agents 232, 237 . . . 242 operate as agent instances within virtual machine (VM) platforms 230, 235 . . . 240 operating within the host server 252, and the tool agents 232/237/242 receive the captured packet traffic from the tap agents 212/217/22 and forward this captured packet traffic to the network tools 231/236/241. Similar tool agents can operate with respect to network tools and VM platforms running in the additional host servers 254 and 256, and so on. The network tools 231/236/241 and tool agents 232/237/242 operate within a virtualization layer 245 that operates on top of an operating system (OS) 246 which in turn operates on computer hardware 247. The computer hardware 247 is coupled to communicate with the network communication paths 270, for example, through one or more network interface cards and/or other network connections.

An agent controller 252 operates as virtual machine (VM) platform on a host server 250, and the agent controller 252 communicates with the tap agents 212/217/222 and tool agents 232/237/242 in order to monitor, manage, and/or control the tap agents 212/217/222 and tool agents 232/237/242. The agent controller 252 operates within a virtualization layer 254 that operates on top of an operating system (OS) 256 which in turn operates on computer hardware 247. The computer hardware 247 is coupled to communicate with the network communication paths 270, for example, through one or more network interface cards and/or other network connections.

As described herein, the tap agents 212/217/222 operating within the host servers 202/204/206 apply deduplication rules 213, 218 . . . 223 that provide for packet deduplication with respect to the packets being captured by the tap agents 212/217/222. The deduplicated (DEDUP) packets 228 are then forwarded to one or more of the tool agents 232/237/242 for receipt and further processing by the network tools 231/236/241. Advantageously, the deduplication occurs at the collection points for the network packets being monitored thereby reducing the amount of bandwidth used for communication of the deduplicated packets 228. The deduplication rules 213/218/223 are based at least in part upon agent configuration information 258 sent by the agent controller 252 to the tap agents 212/217/222. For example, as described below, a registration list of active tap agents can be used to determine which tap agents 212/217/222 are designated to capture network packets from particular network communication source/destination pairs. In addition, the agent controller 252 can also send agent configuration information 259 to the tool agents 232/237/242. The agent controller 252 can also send other management and control information to the tap agents 212/217/222 and tool agents 232/237/242.

The agent controller 252 also uses one or more data storage systems 260 to store agent configuration files 262, an agent registry 264, and/or other desired information. The agent configuration files 262 are used to provide the tap agents 212/217/222 and tool agents 232/237/242 within instructions for the monitoring, capture, and distribution of network packets. The agent registry 264 includes an ordered list of the tap agents 212/217/222 operating within the network monitoring system and being managed by the agent controller 252. The agent controller 252 can also store additional information in the data storage systems 260, and the data storage systems 260 can be included as part of the host server 250. It is noted that the data storage systems 260 can be implemented using one or more non-transitory tangible computer-readable mediums such as FLASH memory, random access memory, read only memory, programmable memory devices, reprogrammable storage devices, hard drives, floppy disks, DVDs, CD-ROMs, and/or any other non-transitory data storage mediums.

It is noted that network communication paths 270 can include one or more wired network communication paths, wireless network communication paths, or a combination of wired and wireless communication paths. The network communication paths 270 can also include one or more intervening network communication devices or systems within a network communication infrastructure. Further, one or more different communication protocols can be used within the network communication paths 270 to communicate network packets through the network communication paths 270. It is noted that the communications 228, 258, and 259 can occur through the network communication paths 270 and/or through one or more other communication paths such as direct packet communications.

It is further noted that the host servers 202/204/206/250/252/254/256 can be implemented using one or more programmable integrated circuits to provide the functionality described herein. For example, one or more processors (e.g., microprocessor, microcontroller, central processing unit, etc.), configurable logic devices (e.g., CPLD (complex programmable logic device), FPGA (field programmable gate array), etc.), and/or other programmable integrated circuit can be programmed with software or other programming instructions to implement the functionality described herein. It is further noted that the software or other programming instructions can be stored in one or more non-transitory computer-readable mediums (e.g., memory storage devices, FLASH memory, DRAM memory, reprogrammable storage devices, hard drives, floppy disks, DVDs, CD-ROMs, etc.), and the software or other programming instructions when executed by the programmable integrated circuits cause the programmable integrated circuits to perform the processes, functions, and/or capabilities described herein for the host servers 202/204/206/250/252/254/256 and their respective components.

Installing tap functionality through the tap agents 212/217/222 within each of the application VM platforms 210/215/220 has a number of advantages. For example, scaling is handled implicitly as the tap agents 212/217/222 will scale directly with the scaling of the application VM platforms 210/215/220. New application VM platform instances will include a tap agent, and any reduction in the number of application VM platform instances will also remove any tap agents running in those application VM platform instances. Further, from inside the application VM platforms 210/215/220, the tap agents 212/217/222 have access to metadata that is outside the contents of the packet itself allowing for a broader basis for high-level forwarding configurations. For example, packet collection or filtering decisions can be made on the basis of operating system (OS), platform metadata, processing metrics (e.g., CPU load), and/or desired information apart from the packets contents themselves. Further examples of information outside the packet contents, which can be used to configure client/tool packet monitor applications and/or to generate filter configurations, include hardware architectures (e.g., number of processors, types of processors, numbers of network interfaces, types of network interfaces), hardware metrics (e.g., processor utilization, memory utilization), operating systems, hypervisor types, VM platform instance metadata (e.g., hostname, virtual operating system, kernel version, other software versions), processing environment information, client provided metadata, and/or other types of data not within the packets themselves. Other variations can also be implemented and other advantages may also be achieved while still taking advantage of the instance based management and control techniques described herein.

It is further noted that U.S. patent application Ser. No. 14/873,896, entitled "DIRECT NETWORK TRAFFIC MONITORING WITHIN VM PLATFORMS IN VIRTUAL PROCESSING ENVIRONMENTS" and filed Oct. 2, 2015, describes various embodiments including packet monitoring embodiments where client monitor applications are installed within VM platforms. U.S. patent application Ser. No. 14/873,896 is hereby incorporated by reference in its entirety. It is also noted that U.S. patent application Ser. No. 15/342,170, entitled "NETWORK TRAFFIC PRE-CLASSIFICATION WITHIN VM PLATFORMS IN VIRTUAL PROCESSING ENVIRONMENTS" and filed Nov. 3, 2016, describes various embodiments including network traffic pre-classification for packet monitoring embodiments with respect to virtual processing environments. U.S. patent application Ser. No. 15/342,170 is hereby incorporated by reference in its entirety.

Figure 3A:
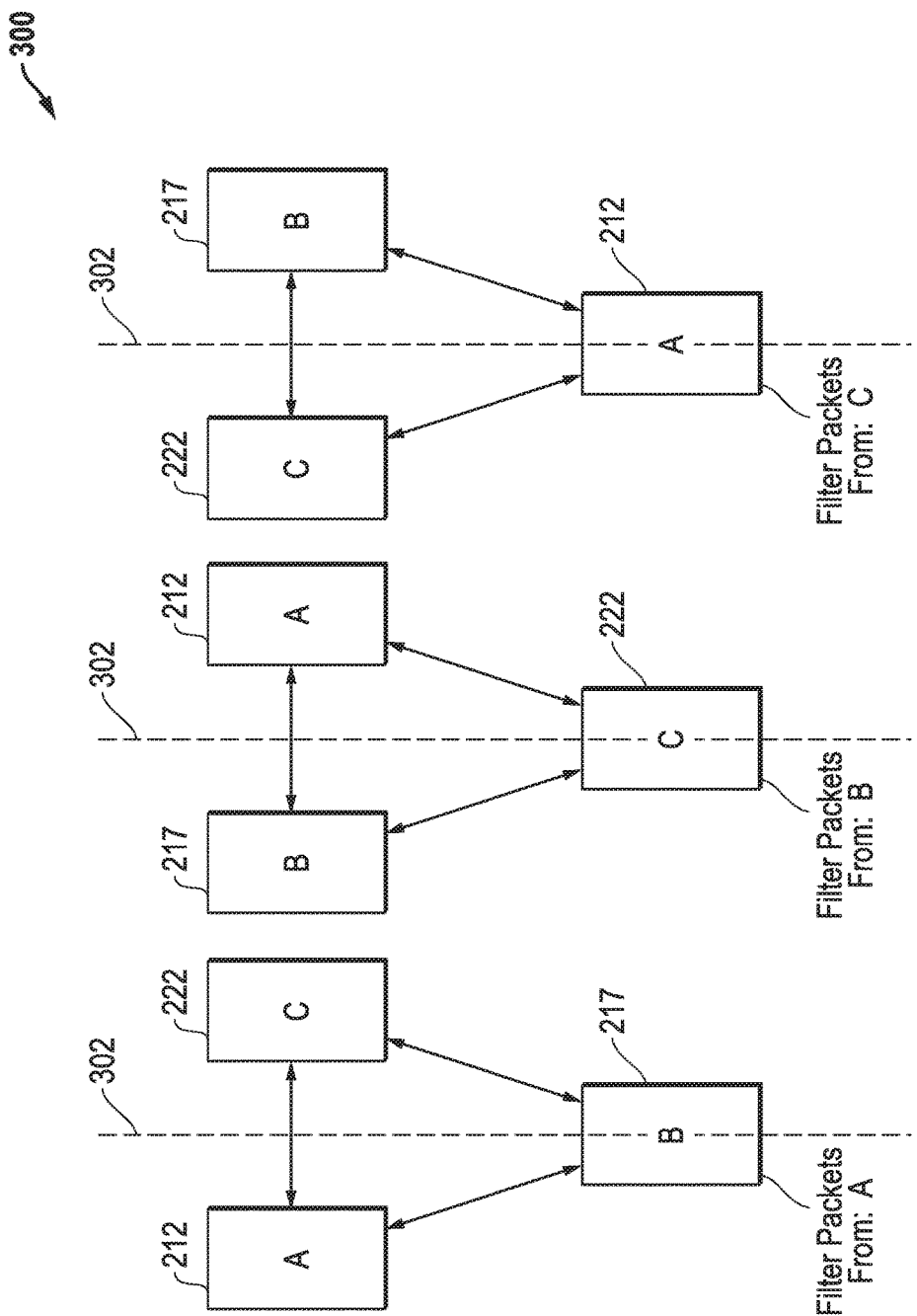
FIG. 3A is a block diagram of an example embodiment for a deduplication technique where an odd number of tap agents are arranged in a sorted ring to determine packet capture responsibilities.

FIG. 3A is a block diagram of an example embodiment 300 for a deduplication technique where an odd number of tap agents are arranged in a sorted ring to determine packet capture responsibilities. For this ring deduplication technique, each node filters traffic from nodes on one side (e.g., left or right side) of the dashed line 302 passing through the node with half of the remaining nodes in the ring on each side of the dashed line 302. For the embodiment 300, three tap agents 212/217/222 are within the sorted ring. The second tap agent (node B) 217 filters and drops packets from the first tap agent (node A) 212 and captures packets from the third tap agent (node C) 222. The third tap agent (node C) 222 filters and drops packets from the second tap agent (node B) 217 and captures packets from the first tap agent (node A) 212. The first tap agent (node A) 212 filters and drops packets from the third tap agent (node C) 222 and captures packets from the second tap agent (node B) 217. For this example embodiment 300, therefore, each node has the responsibility of capturing packets associated with the nodes to the right side of the ring while filtering packets from the left side of the ring as demarcated by the dashed line 302.

Figure 3B:
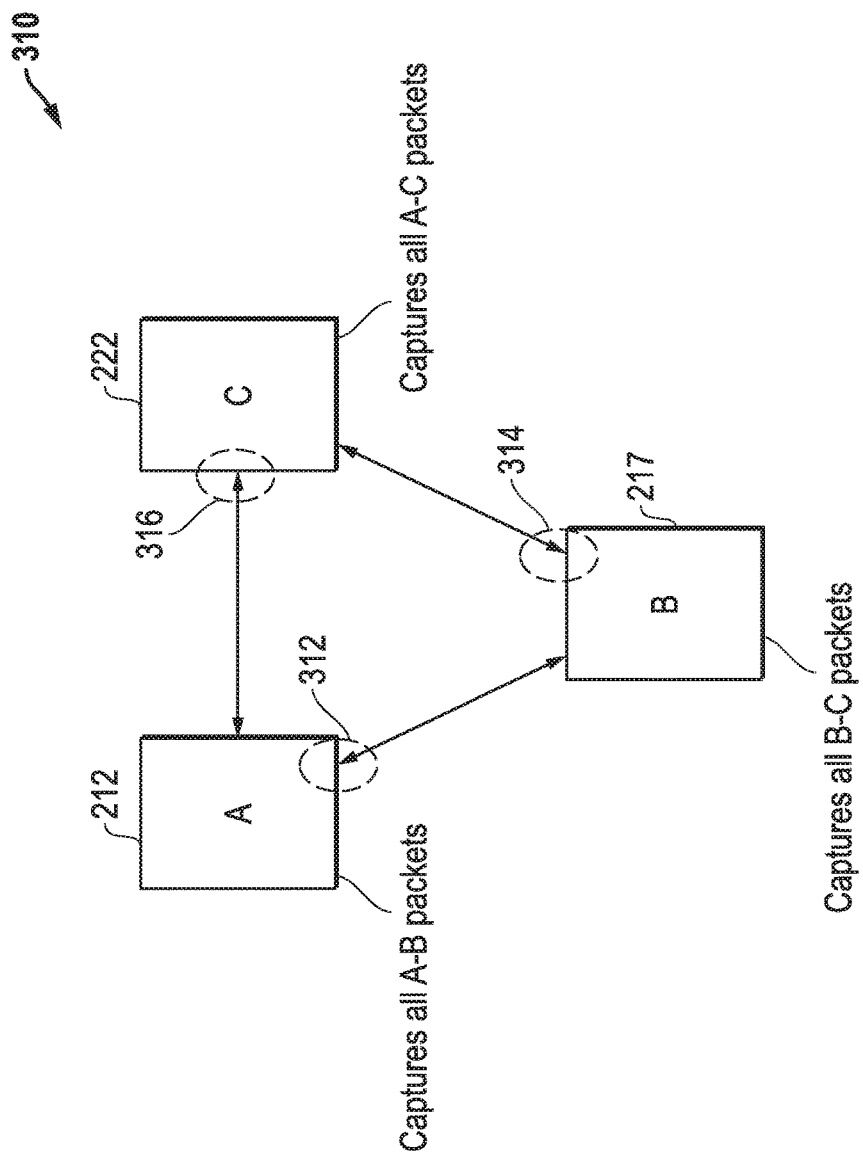
FIG. 3B is a block diagram on an example embodiment for the packet capture associated with the deduplication technique of FIG. 3A.

FIG. 3B is a block diagram on an example embodiment 310 for the packet capture associated with the deduplication technique of FIG. 3A. The first tap agent (node A) 212 captures all packets communicated with the second tap agent (node B) 217. These A-B packets are captured at ingress ports and egress ports for the first tap agent (node A) 212 as represented by dashed circle 312. The first tap agent (node A) 212 filters and drops the packets communicated with the third tap agent (node C) 222. The second tap agent (node B) 217 captures all packets communicated with the third tap agent (node C) 222. These B-C packets are captured at ingress ports and egress ports for the second tap agent (node B) 217 as represented by dashed circle 314. The second tap agent (node B) 217 filters and drops the packets communicated with the first tap agent (node A) 212. The third tap agent (node C) 222 captures all packets communicated with the first tap agent (node A) 212. These A-C packets are captured at ingress ports and egress ports for the third tap agent (node C) 222 as represented by dashed circle 316. The third tap agent (node C) 222 filters and drops the packets communicated with the second tap agent (node B) 222. As such, deduplication rules applied by the tap agents provide for capture of network packets at only one agent associated with packet communications between two agents thereby providing deduplication of captured packets at the tap agents themselves. It is noted that the deduplication rules, for example, can be implemented as packet filters that identify and drop packets based upon source/destination addresses.

Figure 3C:
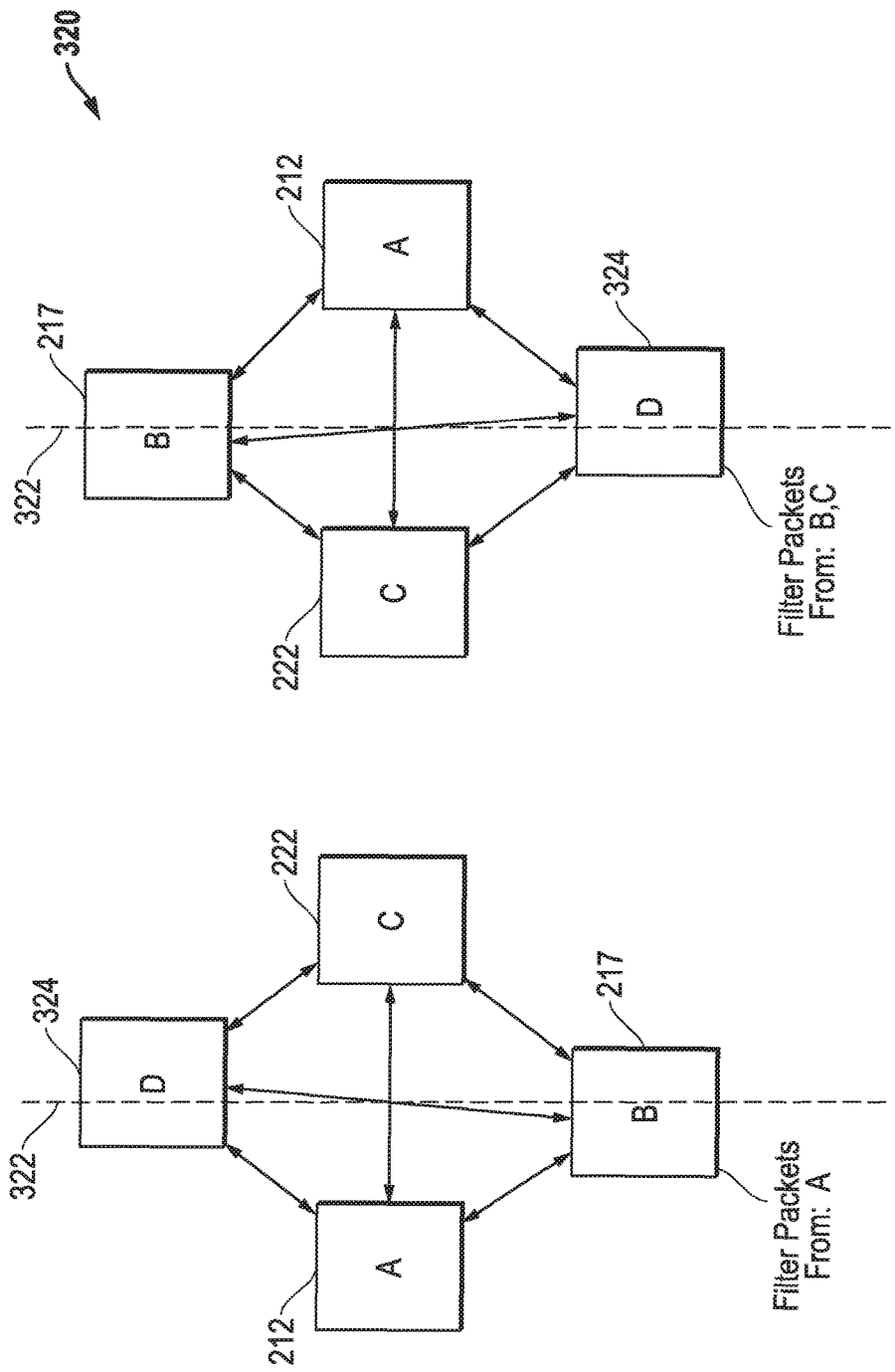
FIG. 3C is a block diagram of an example embodiment for a deduplication technique where an even number of tap agents are arranged in a sorted ring to determine packet capture responsibilities.

FIG. 3C is a block diagram of an example embodiment 320 for a deduplication technique where an even number of tap agents are arranged in a sorted ring to determine packet capture responsibilities. For this ring deduplication technique, each node filters traffic from nodes on one side (e.g., left or right side) of the dashed line 322 passing through the node with half of the remaining nodes (less one) in the ring on each side of the dashed line 322. As there are an even number of nodes, one additional node is included on one side (e.g., left or right) of dashed line 322 for each given node based upon a predetermined deciding factor. For example, with respect to the alphabetical order shown for embodiment 320, the deciding factor can be whether the additional node comes before or after the node being considered. In particular, for embodiment 320, if the additional top node comes after the bottom node in the alphabetical order, that additional top node is moved to the right of dashed line 322 and included in packet capture by the bottom node being considered. If the additional top node comes before the bottom node in the alphabetical order, that additional top node goes on the left of dashed line 322 and is filtered out from packet capture by the bottom node being considered.

It is noted that if the additional node were always placed on a particular side of dashed line 322 (e.g., right side), then duplicate capture would occur. For this situation applied to embodiment 320, for example, the second tap agent (node B) 217 would be set to capture B-D packets, and the fourth tap agent (node D) 324 would also be set to capture for B-D packets thereby leading to duplicate packet capture.

Looking more particularly to embodiment 320, four tap agents 212/217/222/324 are within the sorted ring, and the deduplication associated with the second tap agent (node B) 217 and the fourth tap agent (node D) 324 are shown. The second tap agent (node B) 217 filters and drops packets from the first tap agent (node A) 212 while capturing packets from the third tap agent (node C) 222 and the fourth tap agent (node D) 324. The additional fourth tap agent (node D) 324 has been placed on the right side of dashed line 322 as being after the second tap agent (node B) 217 in the alphabetic sorted ring. The fourth tap agent (node D) 324 filters and drops packets from the second tap agent (node B) 217 and the third tap agent (node C) 222 while capturing packets from the first tap agent (node A) 212. The additional second tap agent (node B) 217 has been placed on the left side of dashed line 322 as being before the fourth tap agent (node D) 324 in the alphabetic sorted ring. For this example embodiment 320, therefore, each node has the responsibility of capturing packets associated with the nodes to the right side of the ring while filtering packets from the left side of the ring as demarcated by the dashed line 322 and as determined by the deciding factor predetermined for the additional node within the even number ordered ring.

Figure 3D:
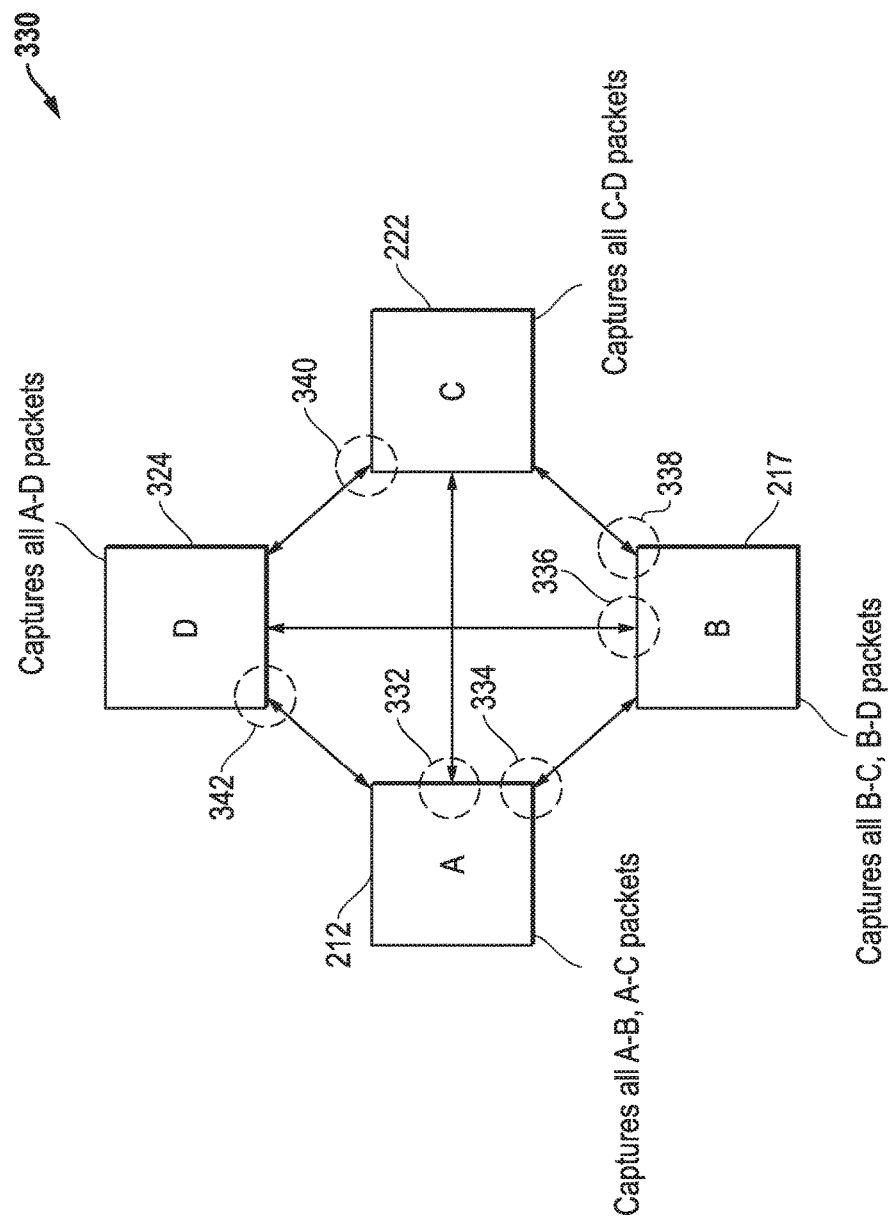
FIG. 3D is a block diagram on an example embodiment for the packet capture associated with the deduplication technique of FIG. 3C.

FIG. 3D is a block diagram on an example embodiment 310 for the packet capture associated with the deduplication technique of FIG. 3C. The first tap agent (node A) 212 captures all packets communicated with the second tap agent (node B) 217 and the third tap agent (node C) 222. These A-B and A-C packets are captured at ingress ports and egress ports for the first tap agent (node A) 212 as represented by dashed circles 332 and 334, respectively. The first tap agent (node A) 212 filters and drops the packets communicated with the fourth tap agent (node D) 324. The second tap agent (node B) 217 captures all packets communicated with the third tap agent (node C) 222 and the fourth tap agent (node D) 324. These B-C and B-D packets are captured at ingress ports and egress ports for the second tap agent (node B) 217 as represented by dashed circles 336 and 338, respectively. The second tap agent (node B) 217 filters and drops the packets communicated with the first tap agent (node A) 212. The third tap agent (node C) 217 captures all packets communicated with the fourth tap agent (node D) 324. These C-D packets are captured at ingress ports and egress ports for the third tap agent (node C) 222 as represented by dashed circles 340. The third tap agent (node C) 222 filters and drops the packets communicated with the first tap agent (node A) 212 and the second tap agent (node B) 217. The fourth tap agent (node D) 324 captures all packets communicated with the first tap agent (node A) 212. These A-D packets are captured at ingress ports and egress ports for the fourth tap agent (node D) 324 as represented by dashed circles 342. The fourth tap agent (node D) 324 filters and drops the packets communicated with the second tap agent (node B) 217 and the third tap agent (node C) 222. As such, deduplication rules applied by the tap agents provide for capture of network packets at only one agent associated with packet communications between two agents thereby providing deduplication of captured packets at the tap agents themselves. It is noted that the deduplication rules, for example, can be implemented as packet filters that identify and drop packets based upon source/destination addresses.

Figure 4:
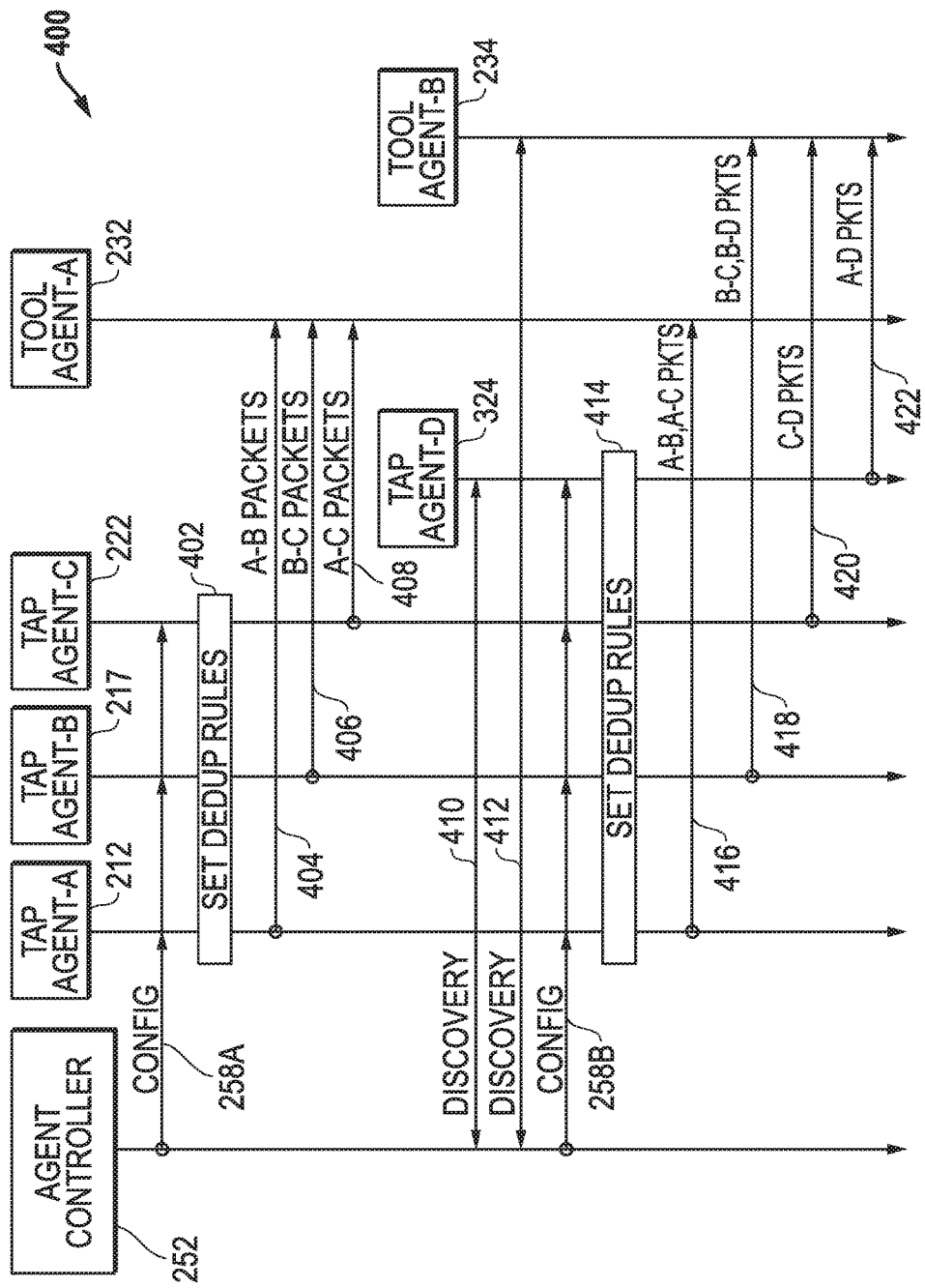
FIG. 4 is a swim lane diagram of an example embodiment for the deduplication techniques of FIGS. 3A-D where configuration information, such as a registry list of tap agents, from an agent controller is used to set deduplication rules within the tap agents.

FIG. 4 is a swim lane diagram of an example embodiment 400 for the deduplication techniques of FIGS. 3A-D where configuration information, such as a registry list of tap agents, from an agent controller 252 is used to set deduplication rules within the tap agents 212/217/222/324. The agent controller 252 sends configuration information 258A to the tap agents 212/217/222, and this configuration information can include a registry list of tap agents that are operating together to capture packets of interest within a network packet communication system. Each of the tap agents 212/217/222 receives this registry list and uses the registry list to place itself within an ordered list of tap agents. This ordered list in effect provides a sorted ring as indicated above with respect to FIGS. 3A-B. Based upon the sorted ring generated from this registry list, each of the tap agents 212/217/222 generates and applies deduplication rules as indicated by block 402 and as described above. The first tap agent (node A) 212 then sends A-B packets to a network destination such as a first tool agent (agent-A) 232. The second tap agent (node B) 217 then sends B-C packets to a network destination such as the tool agent (agent-A) 232. The third tap agent (node C) 222 then sends A-C packets to a network destination such as the tool agent (agent-A) 232.

For the embodiment 400, it is then assumed that a fourth tap agent (node D) 324 is added to the original three tap agents 212/217/222 that are operating together to capture packets of interest within a network packet communication system. The fourth tap agent (node D) 324 and the agent controller 252 can communicate with each other through discovery messages 410 so that the agent controller 252 becomes aware of the new tap agent 324. It is also assumed that a second tool agent (agent-B) 234 is also added to process packets in addition to the first tool agent (agent-A) 232. The second tool agent (agent-B) 234 and the agent controller 252 can also communicate with each other through discovery messages 412 so that the agent controller 252 becomes aware of the new tool agent 234. New configuration information 258B is then sent to the tap agents 212/217/222/324, and this configuration information can again include a registry list of tap agents that are operating together to capture packets of interest within a network packet communication system. Each of the tap agents 212/217/222/324 receives this registry list and uses the registry list to place itself within an ordered list of tap agents. This ordered list in effect provides a sorted ring as indicated above with respect to FIGS. 3C-D. Based upon the sorted ring generated from this registry list, each of the tap agents 212/217/222/324 generates and applies deduplication rules as indicated by block 414 and as described above. The first tap agent (node A) 212 then sends A-B packets and A-C packets to a network destination such as the first tool agent (agent-A) 232. The second tap agent (node B) 217 then sends B-C packets and B-D packets to a network destination such as the second tool agent (agent-B) 234. The third tap agent (node C) 222 then sends C-D packets to a network destination such as the first tool agent (agent-A) 232. The fourth tap agent (node D) 324 then sends A-D packets to a network destination such as the second tool agent (agent-B) 234. It is noted that the agent controller 252 can also send configuration information to the tool agents 232/234, and that the configuration information 258B sent to the tap agents 212/217/222/324 can indicate which tool agent 232/234 is to receive packets captured by each respective tap agent 212/217/222/324/

The deduplication techniques of FIGS. 3A-D and FIG. 4 provide for a relatively even breakdown of forwarded packets if it assumed that the number of packets communicated between node pairs is roughly equivalent. However, if the number of packets communicated between node pairs differs significantly, then the numbers of deduplicated packets being captured and forwarded by a given tap agent could be disproportionally high as compared to other tap agents.

Figure 5A:
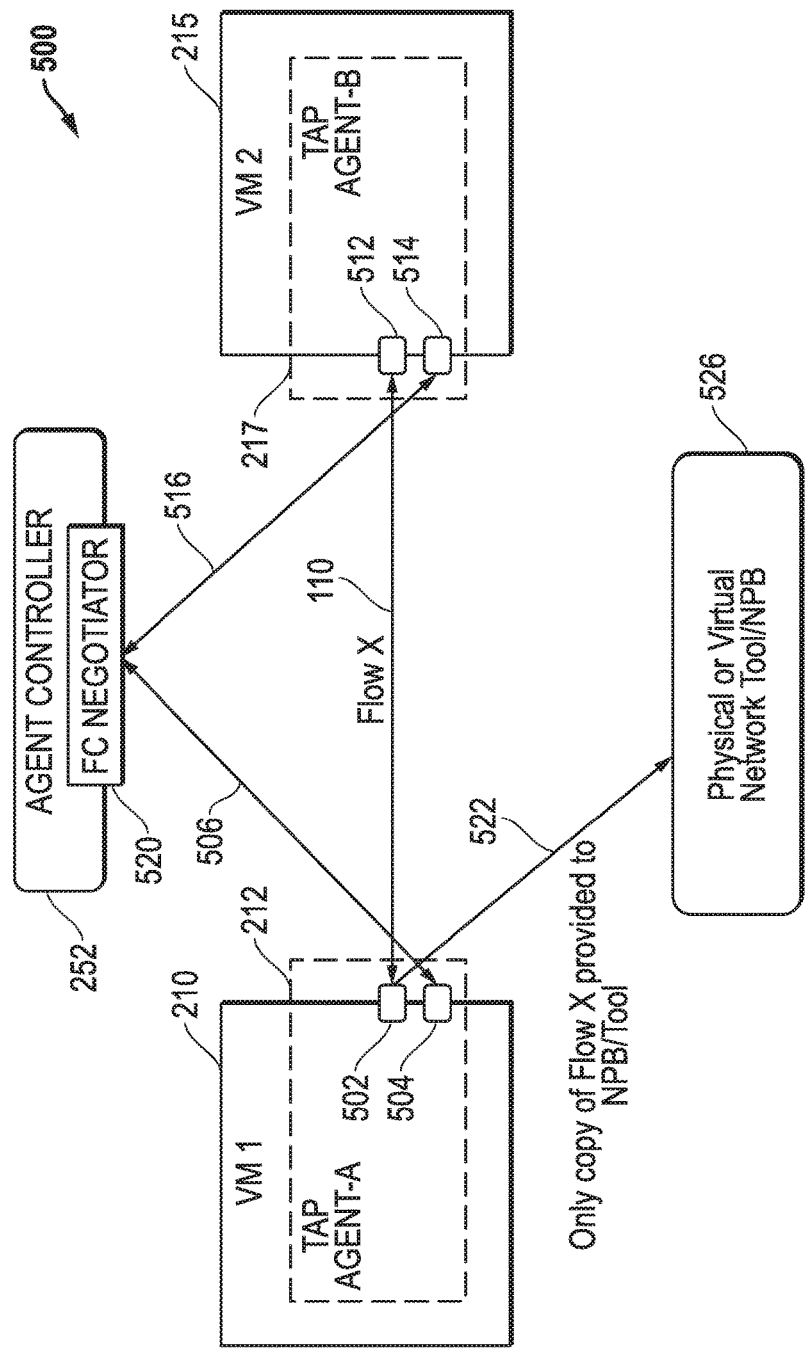
FIG. 5A is a block diagram of an example embodiment where an agent controller includes a flow control (FC) negotiator that determines which tap agent will capture packets associated with a particular flow.
Figure 5B:
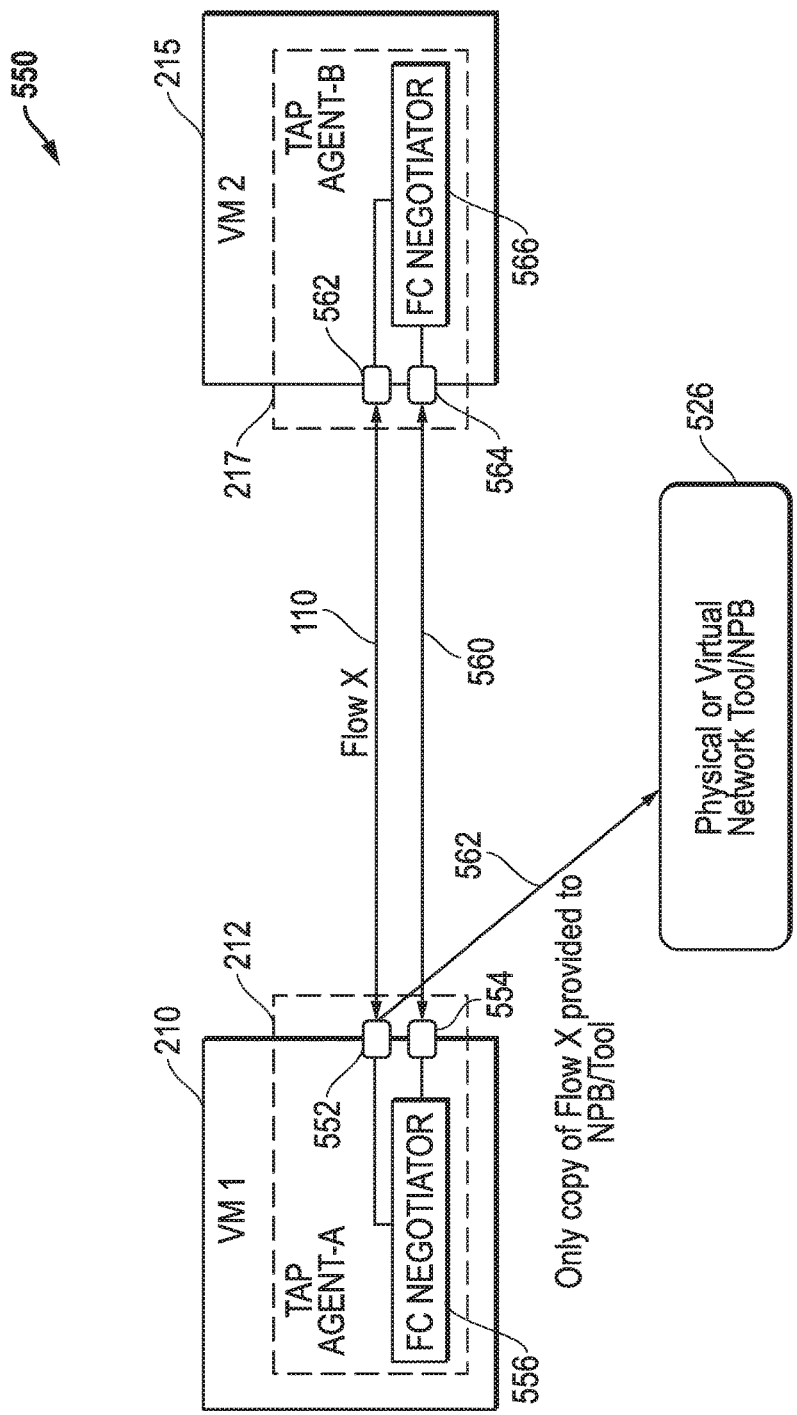
FIG. 5B is a block diagram of an example embodiment where flow control (FC) negotiators within the tap agents negotiate and determine which tap agent will capture packets associated with a particular flow.

FIGS. 5A-B provide example embodiments for per-flow based decisions for a tap agent communication pair. For FIG. 5B, a system for monitoring a communications network includes a first tap agent and a second tap agent that each analyze metadata associated with flows that they are observing. The two tap agents jointly determine that they are both observing packets from the same flow and negotiate between themselves to determine which tap will capture packets associated with the flow. For FIG. 5A, a system for monitoring a communications network includes a first tap agent, a second tap agent, and an agent controller. The first and second tap agents initially provide information concerning their packet flows to the agent controller. The agent controller then selects one of the two tap agents to be responsible for capturing packets for the packet flow. The agent controller generates and sends configuration information or instructions to each agent tap to provide for the capture responsibilities in order to provided packet deduplication.

FIG. 5A is a block diagram of an example embodiment 500 where the agent controller 252 includes a flow control (FC) negotiator 520 that determines which tap agent 212/217 will capture packets associated with a particular flow (Flow X) 110. The FC negotiator 520 receives flow information 506/516 through control ports 504/514 from the tap agents 212/215 that provide information concerning the packet flows being received by the VM platforms 210/215. The FC negotiator 520 then determines which of the tap agents 212/215 is to be assigned the responsibility of capturing packets associated with the flows. This decision can be based on processing loads of the tap agents 212/217, load of the VM platforms 210/215, other load-sharing algorithm, and/or other parameters. For the embodiment 500, the FC negotiator 520 has selected tap agent 212 to capture packets associated with the flow (Flow X) 110. As such, a single copy of the network packets within this flow 110 are captured at ingress/egress port 502 for the first tap agent 212, and network packets associated with this flow 110 received at ingress/egress port 512 for the second tap agent 217 are filtered and dropped. The captured packets 522 are then provided to a network destination such as a physical or virtual network tool or NPB (network packet broker) 526. Because deduplication of packets is handled at the point of capture by the selection of tap agent 212 to capture the packets for flow (Flow X) 110, the deduplication processing burden is removed from the network tool or NPB 526.

It is noted that each flow being processed by the tap agent pair 212/217 can be handled differently with respect to capture responsibilities. As such, deduplication of packets captured by the tap agent pair 212/217 is implemented on a per-flow basis. For example, the tap agents 212/217 report metadata for observed flows to the FC negotiator 520 for the agent controller 252, and the FC negotiator 520 for the agent controller 252 determines which tap agent 212/217 will handle the capture of packets for each flow. This decision can be based upon processing loads of the tap agents 212/217, load of the VM platforms 210/215, other load-sharing algorithm, and/or other parameters.

FIG. 5B is a block diagram of an example embodiment 550 where flow control (FC) negotiators 556/566 within the tap agents 212/217 negotiate and determine which tap agent will capture packets associated with a particular flow (Flow X) 110. The FC negotiators 556/566 exchange information through control ports 554/564 to negotiate which of the tap agents 212/215 will capture packets within the packet flows being received by the VM platforms 210/215. This decision can be based on processing loads of the tap agents 212/217, load of the VM platforms 210/215, other load-sharing algorithm, and/or other parameters. For the embodiment 550, the FC negotiators 556/566 have selected tap agent 212 to capture packets associated with the flow (Flow X) 110. As such, a single copy of the network packets within this flow 110 are captured at ingress/egress port 552 for the first tap agent 212, and network packets associated with this flow 110 received at ingress/egress port 562 for the second tap agent 217 are filtered and dropped. The captured packets 562 are then provided to a network destination such as a physical or virtual network tool or NPB (network packet broker) 526. Because deduplication of packets is handled at the point of capture by the selection of tap agent 212 to capture the packets for flow (Flow X) 110, the deduplication processing burden is removed from the network tool or NPB 526.

It is again noted that each flow being processed by the tap agent pair 212/217 can be handled differently with respect to capture responsibilities. As such, deduplication of packets captured by the tap agent pair 212/217 is implemented on a per-flow basis. For example, the FC negotiators 556/566 for the tap agents 212/217 can trade metadata for observed flows and negotiate to determine which tap agent 212/217 will handle the capture of packets for each flow. This decision can be based upon processing loads of the tap agents 212/217, load of the VM platforms 210/215, other load-sharing algorithm, and/or other parameters.

For additional embodiments with respect to FIGS. 5A-B, the tap agent selected to capture packets is designated the active agent, and the other tap agent is designated the standby agent. In addition, the tap agents 212/217 in FIG. 5A or the FC negotiator 556/566 in FIG. 5B may also be configured to transmit and receive heartbeat messages to each other and/or other periodic health messages in order to insure that the designated tap agent is operable and able to capture flow packets as per the negotiation. If a heartbeat and/or health message is not received for the active tap agent within a predetermined period of time, a failure event can be indicated for the active tap agent. If such a failure event occurs, the standby agent assumes control and responsibility for capturing the packets within the flow as the new active agent. For FIG. 5A, the agent controller 252 provides control messages to the standby agent to cause it to become the active agent. For FIG. 5B, the standby agent automatically assumes the position of active agent upon occurrence of the failure event. Once the standby-to-active mode transition has occurred, these captured packets are again forwarded to the network destination so that network packets within the flow are still received despite the failure of the initial active agent.

Figure 6A:
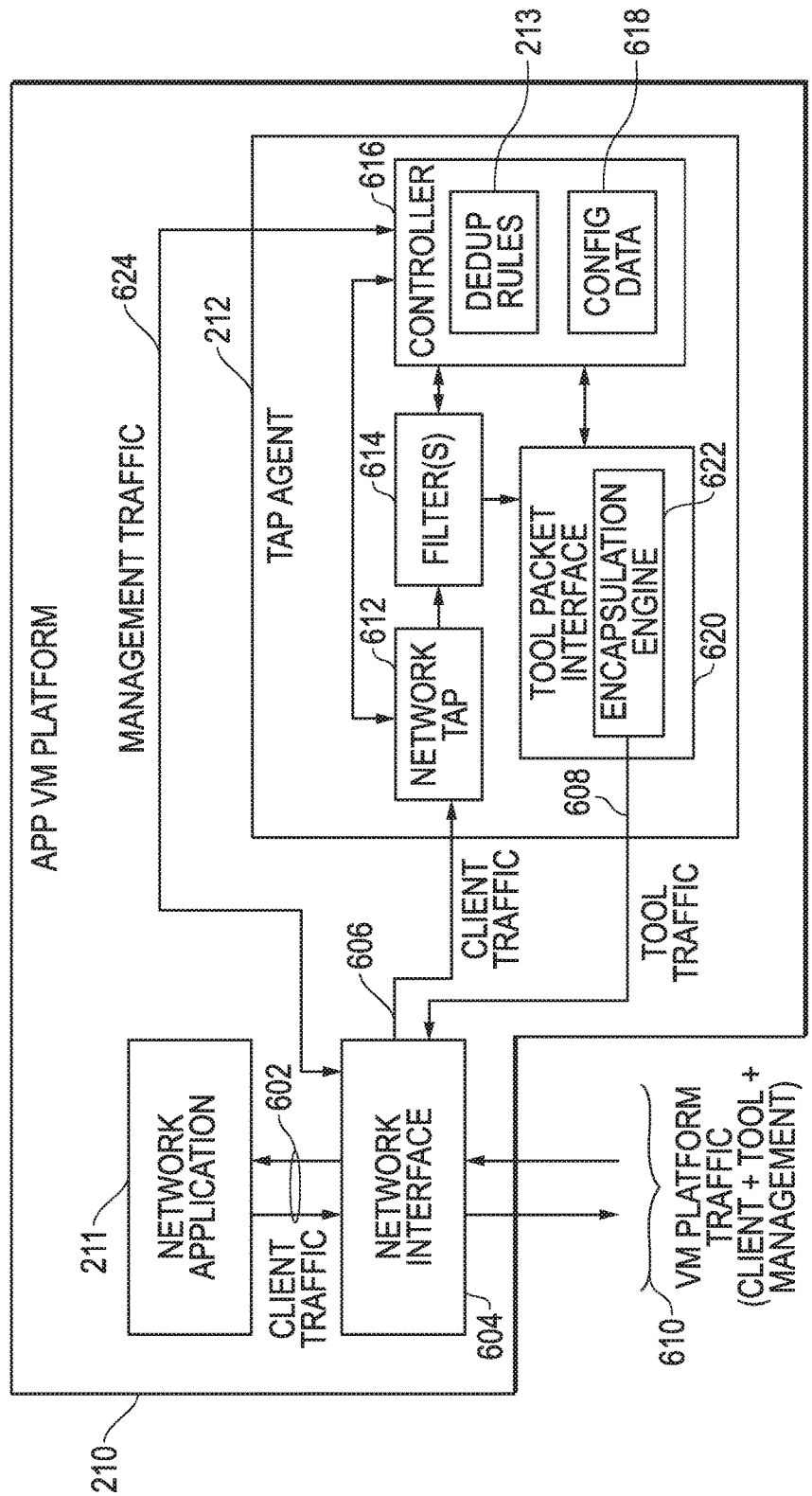
FIG. 6A is a block diagram of an example embodiment for an application VM platform that includes a tap agent.

FIG. 6A is a block diagram of an example embodiment for an application VM platform 210 that includes a tap agent 212. The tap agent 212 includes a network TAP 612, one or more filters 614, tool packet interface 620, and controller 616. The controller 616 operates to control the components of the tap agent 212 and stores deduplication rules 213 as well as other configuration data 618. The tool packet interface 620 can also include an encapsulation engine 622, for example, where packet encapsulation is used to forward captured packets to network destinations. The network application 211 sends and receives packets as client traffic 602 through a virtual network interface 604. The virtual network interface 604 in turn communicates VM platform traffic 610 with other VM platforms and/or external systems through the network communication paths 270. As described herein, this VM platform traffic 610 includes client traffic 602, tool traffic 608 directed to one or more network tools or other destinations, management traffic 624 communicated with the agent controller 252, and any other traffic for the application VM platform 210.

In operation, the network tap 612 operates to obtain copies 606 of the client traffic 602 being communicated through the network interface 604. This copied traffic 606 is then processed by one or more filters 614 to identify traffic of interest to be captured. The controller 616 applies the deduplication rules 213 to the filters 614 to provide for packet deduplication as described herein, for example, as based upon configuration data 618 received from the agent controller 252. This traffic of interest is sent to the tool packet interface 620 which uses the encapsulation engine 622, if included, to add encapsulation headers to the traffic of interest. The resulting tool traffic 608 is then provided back to the network interface 604 for communication as part of the VM platform traffic 610.

Figure 6B:
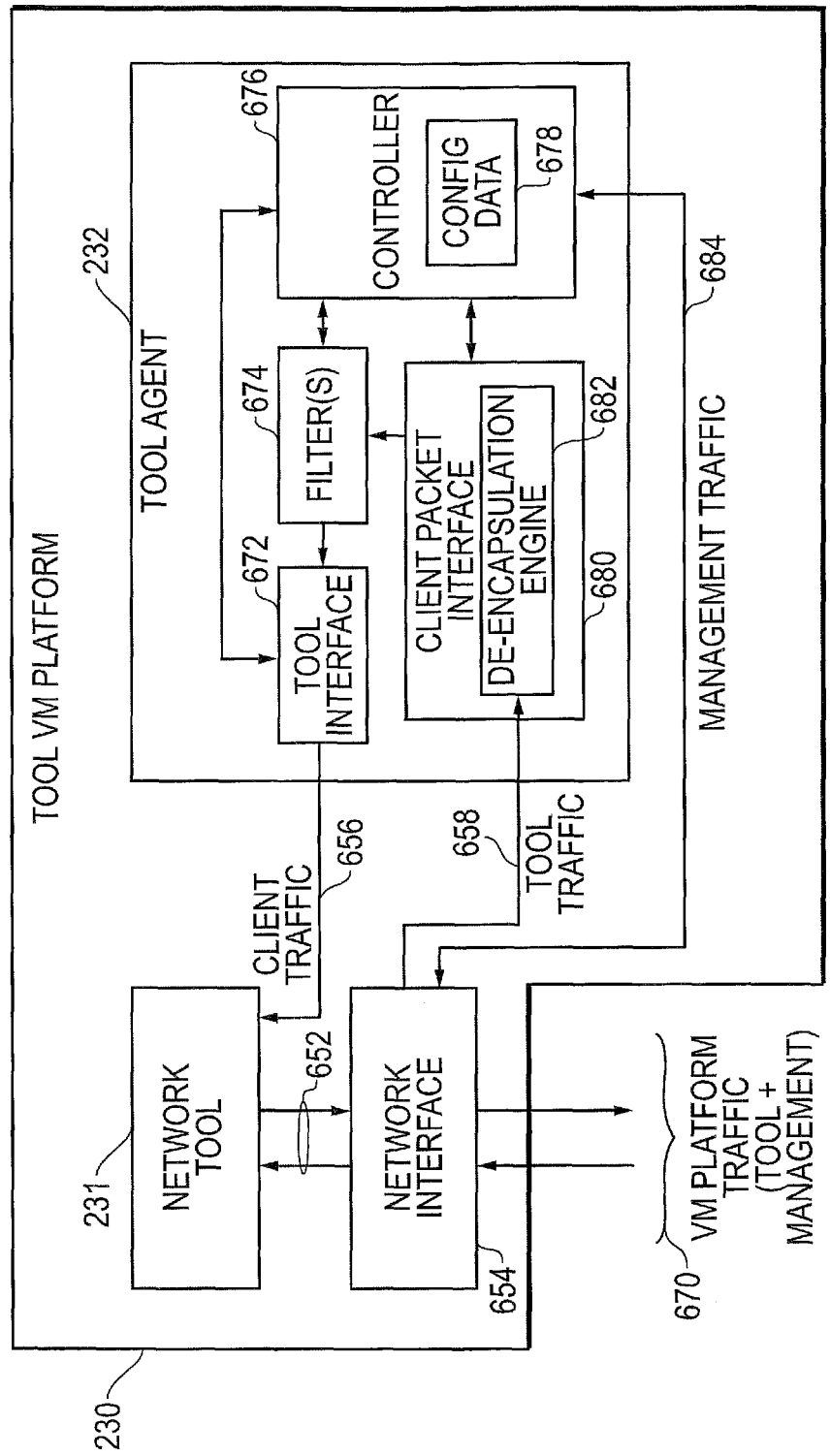
FIG. 6B is a block diagram of an example embodiment for a tool VM platform that includes a network tool.

FIG. 6B is a block diagram of an example embodiment for a tool VM platform 230 that includes a network tool 231. The network tool agent 232 includes a tool interface 672, one or more filters 674, client packet interface 680, and controller 676. The client packet interface 680 also includes a de-encapsulation engine 682 where encapsulation has been used by the tap agents with respect to captured packets. The controller 676 operates to control the components of the tool agent 232 and to store configuration data 678. The network tool 231 analyze received packets within client traffic 656 from the tool agent 232. The network tool 231 can also send and receive other traffic 652 directly through a network interface 654. The network interface 654 communicates VM platform traffic 670 with other VM platforms and/or external systems through the network communication paths 270. As described herein, this VM platform traffic 670 includes tool traffic 658 from one or more tap agents, management traffic 684 communicated with the agent controller 252, and any other traffic for the tool VM platform 230.

In operation, the client packet interface 680 receives tool traffic 658 communicated by the tap agents. The client packet interface 680 uses the de-encapsulation engine 682 to remove encapsulation headers from the traffic of interest where encapsulation has been used. The de-encapsulated traffic can also be processed by one or more filters 674 to further select traffic of interest. The filtered traffic of interest is then provided to the tool interface 672, and this resulting client traffic 656 is communicated to the network tool 231.

It is noted that the filters 614/674 in FIGS. 6A-B can rely upon various portions of the content of network packets to identify and filter packets. For example, filters 614/674 can be configured to rely upon data and/or information associated with any network layer header values or packet field contents to perform such actions. With respect to network layers, packet-based communications are often described in terms of seven communication layers under the ISO/OSI (International Standards Organization/Open Systems Interconnect) model: application layer (L7), presentation layer (L6), session layer (L5), transport layer (L4), network layer (L3), data link layer (L2), and physical layer (L1). Packet headers associated with any of these layers as well as packet data payload contents, therefore, can be used by the filters 614/674. For example, information pertinent to identifying a packet, such as source ID and destination ID and protocol type, is often found in one or more network layer headers. Packets also have various other identification fields and content information within them that may be matched and used to collect and aggregate information about packets and related packet flows. Still further, the filters 614/674 can also rely upon non-packet content related information. For example, information concerning application states, message states, operating system, and/or other information that is not within the packets themselves can be used by the filters 614/674. Thus, a wide variety of packet content and non-packet content related data and information can be identified and used by the filters 614/674.

Figure 7:
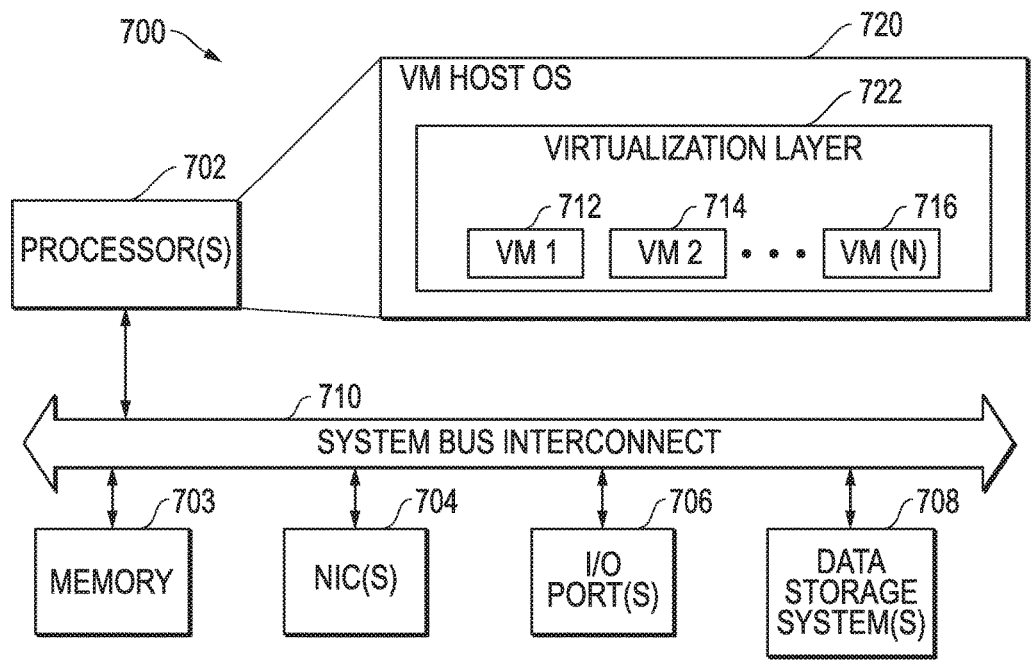
FIG. 7 is a block diagram of an example embodiment for a host server.

FIG. 7 is a block diagram of an example embodiment 700 for a host server such as host servers 202/204/206/250/252/254/256. For the example embodiment depicted, the host server 700 includes one or more processors 702 or other programmable integrated circuits that are programmed to provide a virtualization layer 722 on top of which operates one or more virtual machine (VM) platforms 712, 714, . . . 716. The host server 700 also includes one or more network interface cards (NICs) 704, one or more input/output (I/O) ports 706, one or more data storage systems 708, and memory 703 coupled to communicate with each other through a system bus interconnect 710. In operation, virtualization layer 722 and the VM platforms (VM1, VM2 . . . VM(N)) 712, 714, . . . 716 run on top of a VM host operating system (OS) 720. For example, the VM host operating system 720, the virtualization layer 722, and the VM platforms 712, 714, . . . 716 can be initialized, controlled, and operated by the processors or programmable integrated circuits 702 which load and execute software code and/or programming instructions stored in the data storage systems 708 to perform the functions described herein.

The memory 703 can include one or more memory devices that store program instructions and/or data used for operation of the host server 700. For example, during operation, one or more of the processor(s) 702 can load software or program instructions stored in the data storage systems 708 into the memory 703 and then execute the software or program instructions to perform the operations and functions described herein. In addition, for operation, one or more of the processors 702 or other programmable integrated circuit(s) can also be programmed with code or logic instructions stored in the data storage systems 708 to perform the operations and functions described herein. It is noted that the data storage system(s) 708 and the memory 703 can be implemented using one or more non-transitory tangible computer-readable mediums, such as for example, data storage devices, FLASH memory devices, random access memory (RAM) devices, read only memory (ROM) devices, other programmable memory devices, reprogrammable storage devices, hard drives, floppy disks, DVDs, CD-ROMs, and/or other non-transitory data storage mediums. It is further noted that the programmable integrated circuits can include one or more processors (e.g., central processing units (CPUs), controllers, microcontrollers, microprocessors, hardware accelerators, ASICs (application specific integrated circuit), and/or other integrated processing devices) and/or one or more programmable logic devices (e.g., CPLDs (complex programmable logic devices), FPGAs (field programmable gate arrays), PLAs (programmable logic array), reconfigurable logic circuits, and/or other integrated logic devices). Other variations and processing or computing platforms can also be implemented while still taking advantage of the instance based management and control techniques described herein.

Figures 8A, 8B:
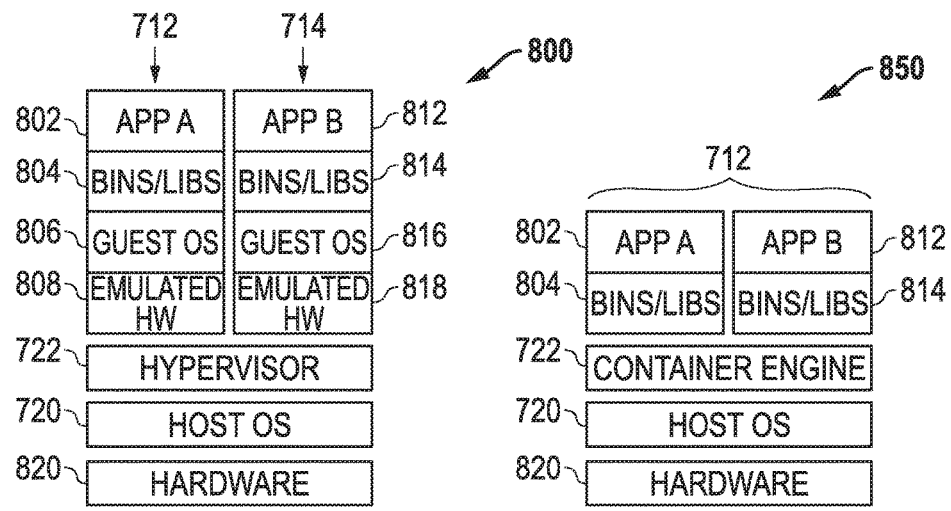
FIG. 8A, a diagram is provide of an example embodiment that uses a hypervisor to provide a virtualization layer.
FIG. 8B is a block diagram of an example embodiment that uses a container engine to provide a virtualization layer.

The virtualization layer 722 for the VM platforms described herein can be implemented using any desired virtualization layer, such as using a hypervisor or a container engine, that provides a virtual processing environment for the VM platforms. Using a hypervisor, as shown in FIG. 8A below, the tap/tool agents operate in addition to an application 802/812 on a guest operating system 806/816 within one of the VM platforms 712/714 which in turn run on top of the hypervisor as the virtualization layer 722. Using a container engine, as shown in FIG. 8B below, the tap/tool agents operate along with applications 802/812 within a VM platform 712 that operates on top of the container engine as the virtualization layer 722. As depicted in FIG. 8B, the VM platform 712 for this embodiment operates as a virtual computing platform without the emulated hardware (HW) 808 and without the guest operating system (OS) 806 that are shown with respect to the embodiment of FIG. 8A. In this container engine embodiment, the applications 802/812 as well as the tap/tool agents are containers or other software components within a single VM platform 712. This container engine embodiment of FIG. 8B thereby provides a more streamlined technique that adds the tap/tool agents to a VM platform as the containers are relatively isolated from each other. For one embodiment, the container engine can be implemented as a DOCKER container for a Linux operating system configured to execute DOCKER containers, which are software components that are designed to be compatible with a Linux-based DOCKER container engine. Other variations could also be implemented.

Looking now in more detail to FIG. 8A, a diagram is provide of an example embodiment 800 that uses a hypervisor to provide a virtualization layer 722. For the embodiment 800, VM platforms 712 and 714 operate on top of hypervisor 722 which in turn operates on top of host operating system (OS) 720 which in turn operates on top of server hardware 820. For this embodiment 800, emulated hardware (HW) resources 808 and a guest operating system (OS) 806 are provided for VM platform 712, and VM platform 712 executes binary code (BINS) or libraries (LIBS) 804 on top of the guest operating system 806 to provide a first application (APP A) 802. Similarly, emulated hardware (HW) resources 818 and a guest operating system (OS) 816 are provided for VM platform 714, and VM platform 714 executes binary code (BINS) or libraries (LIBS) 814 on top of guest operating system 816 to provide a second application (APP B) 812. Thus, each of the VM platforms 712 and 714 have separate emulated hardware resources 808/818 and guest operating systems 806/816. For embodiment 800 as indicated above, a tap/tool agent can be installed and operated within one of the VM platforms 712/714 on top of the guest OS 806/816 along with one of the application 802/812.

FIG. 8B is a block diagram of an example embodiment 850 that uses a container engine to provide a virtualization layer 722. For the embodiment 850, VM platform 712 operates on top of container engine 722 which in turn operates on top of host operating system (OS) 720 which in turn operates on top of server hardware 820. For this embodiment 850, however, the VM platform 712 executes binary code (BINS) or libraries (LIBS) 804 directly on top of the container engine 722 to provide a first application (APP A) 802. The VM platform 712 also executes binary code (BINS) or libraries (LIBS) 814 directly on top of the container engine 722 to provide a second application (APP B) 812. As such, the container engine 722 provides a direct interface to the host operating system 720 without need for emulated hardware (HW) resources 808/818 and/or guest operating systems 806/816 as used in FIG. 8A. For embodiment 850 as indicated above, a tap/tool agent when installed can operate along with the other applications 802/812 on top of the container engine 722 within the VM platform 712.

It is further noted that the functional blocks, components, systems, devices, and/or circuitry described herein can be implemented using hardware, software, or a combination of hardware and software. For example, the disclosed embodiments can be implemented using one or more programmable integrated circuits that are programmed to perform the functions, tasks, methods, actions, and/or other operational features described herein for the disclosed embodiments. The one or more programmable integrated circuits can include, for example, one or more processors and/or PLDs (programmable logic devices). The one or more processors can be, for example, one or more central processing units (CPUs), controllers, microcontrollers, microprocessors, hardware accelerators, ASICs (application specific integrated circuit), and/or other integrated processing devices. The one or more PLDs can be, for example, one or more CPLDs (complex programmable logic devices), FPGAs (field programmable gate arrays), PLAs (programmable logic array), reconfigurable logic circuits, and/or other integrated logic devices. Further, the programmable integrated circuits, including the one or more processors, can be configured to execute software, firmware, code, and/or other program instructions that are embodied in one or more non-transitory tangible computer-readable mediums to perform the functions, tasks, methods, actions, and/or other operational features described herein for the disclosed embodiments. The programmable integrated circuits, including the one or more PLDs, can also be programmed using logic code, logic definitions, hardware description languages, configuration files, and/or other logic instructions that are embodied in one or more non-transitory tangible computer-readable mediums to perform the functions, tasks, methods, actions, and/or other operational features described herein for the disclosed embodiments. In addition, the one or more non-transitory tangible computer-readable mediums can include, for example, one or more data storage devices, memory devices, flash memories, random access memories, read only memories, programmable memory devices, reprogrammable storage devices, hard drives, floppy disks, DVDs, CD-ROMs, and/or any other non-transitory tangible computer-readable mediums. Other variations can also be implemented while still taking advantage of the instance based management and control techniques described herein.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A method to capture network traffic, comprising:
communicating network traffic between applications operating within virtual processing environments within one or more host servers;
monitoring the network traffic between the applications using tap agents operating within the virtual processing environments within the one or more host servers;
for network packet flows communicated between any two applications being monitored by two tap agents:
determining which of the two tap agents is a designated agent to capture the network packets within the packet flows to avoid duplicate packet capture;
capturing the network packets using the designated agent; and
forwarding the captured network packets to one or more network destinations.

2. The method of claim 1, further comprising using a registry list including the tap agents to perform the determining independently at each of the two tap agents.

3. The method of claim 2, wherein the registry list is forwarded to the tap agents by an agent controller.

4. The method of claim 3, wherein the agent controller is operating within a virtual processing environment within a host server.

5. The method of claim 2, further comprising using the registry list to form a sorted ring of network nodes and performing the determining based upon the sorted ring of network nodes.

6. The method of claim 5, wherein the tap agents combine to form an odd number of network nodes, and wherein the determining selects each tap agent as a designated agent with respect to half of remaining tap agents.

7. The method of claim 5, wherein the tap agents combine to form an even number of network nodes, and wherein the determining selects each tap agent as a designated agent for half of remaining tap agents rounded down or rounded up.

8. The method of claim 1, further comprising:
generating deduplication rules based upon the determining, the deduplication rules identifying packets to capture and packets not to capture; and
applying the deduplication rules to the tap agents.

9. The method of claim 8, further comprising using the deduplication rules to implement packet filters for the tap agents.

10. The method of claim 1, wherein at least one of the tap agents is associated with each application.

11. The method of claim 1, wherein the one or more network destinations comprise at least one of a network tool or a network packet broker.

12. The method of claim 11, wherein the one or more network destinations comprise a plurality of network tools operating within virtual processing environments within one or more host servers.

13. The method of claim 1, wherein the determining, capturing, and forwarding are performed independently for each of the network packet flows.

14. The method of claim 13, wherein the determining comprises negotiating between the two tap agents to select the designated agent for each network packet flow.

15. The method of claim 13, wherein the determining comprises communicating flow information from the two tap agents to an agent controller and allowing the agent controller to select the designated agent for each network flow.

16. The method of claim 1, further comprising identifying a standby agent in addition to the designated agent, and capturing the packets using the standby agent if a failure occurs with respect to the designated agent.

17. The method of claim 16, further comprising communicating heartbeat messages with the designated agent, and determining a failure has occurred if a heartbeat message is not communicated within a predetermined period of time.

18. A system to capture network traffic, comprising:
one or more host servers configured to host applications operating within virtual processing environments to communicate network traffic and to host tap agents operating within the virtual processing environments to monitor the network traffic between the applications;
wherein for network packet flows communicated between any two applications monitored by two tap agents, the two tap agents are configured to:
determine which of the two tap agents is a designated agent to capture the network packets to avoid duplicate packet capture;
capture the network packets using the designated agent; and
forward the captured network packets to one or more network destinations.

19. The system of claim 18, wherein the tap agents are further configured to use a registry list including the tap agents to determine the designated agent independently at each of the two tap agents.

20. The system of claim 19, wherein the tap agents are further configured to receive the registry list from an agent controller.

21. The system of claim 20, wherein the agent controller is configured to operate within a virtual processing environment within a host server.

22. The system of claim 19, wherein the tap agents are configured to form a sorted ring of nodes using the registry list and to use the sorted ring of nodes to determine the designated agent.

23. The system of claim 22, wherein the tap agents combine to form an odd number of nodes, and wherein each tap agent is a designated agent with respect to half of remaining tap agents.

24. The system of claim 22, wherein the tap agents combine to form an even number of nodes, and wherein each tap agent is a designated agent for half of remaining tap agents rounded down or rounded up.

25. The system of claim 18, wherein the tap agents are further configured to generate deduplication rules identifying packets to capture and packets not to capture.

26. The system of claim 25, wherein the tap agents are further configured to use the deduplication rules to implement packet filters.

27. The system of claim 18, wherein at least one of the tap agents is associated with each application.

28. The system of claim 18, wherein the one or more network destinations comprise at least one of a network tool or a network packet broker.

29. The system of claim 28, wherein the one or more network destinations comprise a plurality of network tools operating within virtual processing environments within one or more host servers.

30. The system of claim 18, wherein the two tap agents are configured to determine a designated agent independently for each of network packet flows.

31. The system of claim 30, wherein the two tap agents are further configured to negotiate with each other to select the designated agent for each network packet flow.

32. The system of claim 30, wherein the two tap agents are further configured to communicate flow information to an agent controller and to allow the agent controller to select the designated agent for each network flow.

33. The system of claim 18, wherein the tap agents are further configured to determine a standby agent in addition to the designated agent, the standby agent being further configured to capture the packets if a failure occurs with respect to the designated agent.

34. The system of claim 33, wherein the designated agent is further configured to communicate heartbeat messages, and wherein the standby agent is further configured to determine a failure has occurred if a heartbeat message is not communicated within a predetermined period of time.

* * * * *